Feb. 12, 1952 A. AEPPLI 2,585,528
APPARATUS FOR TESTING GEAR TEETH
Filed May 21, 1948
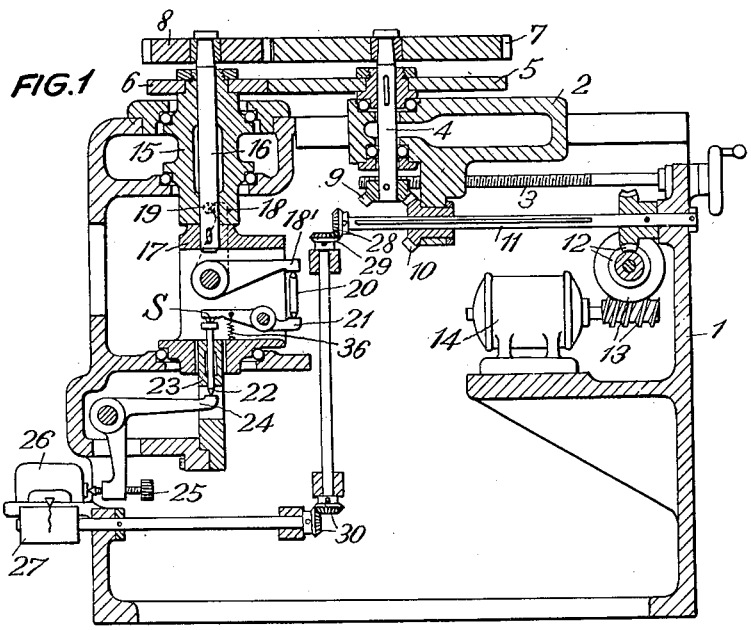
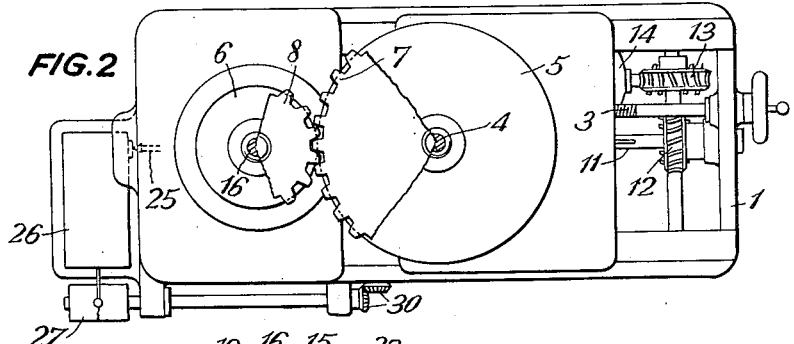
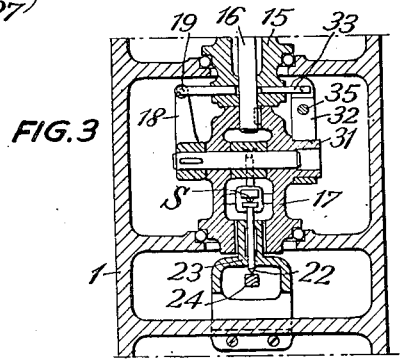
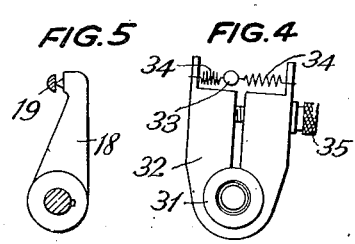
INVENTOR:
Albert Aeppli
by Sommer & Young
Attorneys Patented Feb. 12, 1952

2,585,528

UNITED STATES PATENT OFFICE 2,585,528

APPARATUS FOR TESTING GEAR TEETH

Albert Aeppli, Zurich, Switzerland, assignor to Maag-Zahnrader und -Maschinen Aktiengesellschaft, Zurich, Switzerland Application May 21, 1948, Serial No. 28,335
In Switzerland May 30, 1947

2 Claims. (Cl. 33—179.5)

This invention relates to improvements in apparatus for testing toothed wheels in accord with the single-flank intermeshing method, by means of two cylindrical measuring-discs which are disposed concentric with the toothed wheels and have the same gearing ratio as the latter.

In testing-apparatus of the kind indicated, one of the said discs is fixed to the appurtenant toothed wheel, while the other disc is mounted on a hollow shaft structure which is traversed by a shaft carrying the second toothed wheel to be tested.

In the single-flank intermeshing method, as is known in the art, the teeth of the two wheels in mesh in normal operation, and the tooth-flanks to be tested are slightly spring-loaded to contact each other. The sense of rotation is arbitrary.

In the apparatus according to the present invention, the shaft traversing the said hollow shaft structure, further, is provided with a lever device which transmits the relative movements between the hollow shaft structure and the shaft traversing same, to a transmitting element which does not participate in the rotation of the said two shafts. The said element is provided with a face extending at right angles to the axis of rotation of said shafts, and the said lever device acts in the intersection of the said axis of rotation and the said face. The relative movements of the said two shafts are transmitted through the said element to an indicating device which plots the total meshing error of the two toothed wheels in the form of a curve.

One form of invention is shown, by way of example, in the annexed drawing, in which:

Fig. 1 shows a longitudinal section through the apparatus,

Fig. 2 is a top plan view,

Fig. 3 is a cross-section of the lever device and the shaft engaging device,

Fig. 4 is a view of the latter device, and

Fig. 5 is a partial section through the lever device.

In Fig. 1, a carriage 2 is displaceably mounted on a guideway of the bed 1 and may be moved by means of the spindle 3. A vertical shaft 4 is rotatably mounted on the carriage 2, and carries on its head a cylindrical measuring disc 5 and the toothed wheel 7 to be tested. The latter and the disc 5 are secured to shaft 4. A bevel gear 9 is pinned to the foot of shaft 4 and is operatively connected to a worm gear 12 through a bevel gear 10 and a splined shaft 11 and a second bevel gear fixedly mounted on shaft 11.

Worm gear 12 is driven from an electric motor 14 through another worm gear 13. The worm gears 12, 13 reduce the comparatively high speed of motor 14 to such extent that the toothed wheel 7, which is to be tested, moves at a very low speed.

A vertical hollow sleeve structure 15 is journaled in the bed 1, and a cylindrical measuring disc 6 is secured to the upper end of the sleeve 15. The disc 6 is frictionally coupled to disc 5, these two discs being pressed against each other by means of the carriage 2 and the spindle 3. The hollow sleeve structure 15 is traversed by a shaft 16 which is a sliding fit therein. The second toothed wheel 8 is secured to the head of shaft 16, and normally meshes with the toothed wheel 7. A housing 17 is keyed to the foot of shaft 16, and its bottommost portion, which forms an extension of shaft 16, also is journaled in the bed 1.

A lever device for transmitting the relative movements of the sleeve 15 and shaft 16, is disposed in the housing 17. A bell crank lever 18, 18' is keyed to a horizontal pin which is rotatably mounted in the housing 17 at right angles to shaft 16. The tip of the upright arm 18 abuts against a flattened portion of a horizontal stud 19 (Figs. 3, 5) which is rigidly secured to the hollow shaft structure 15. The horizontal arm 18' of said bell crank lever transmits its movement to a two armed lever 21 which also is pivoted in housing 17. The free end of lever 21 is provided with a spherical tip S which is disposed accurately on the axis of shaft 16. The tip S abuts against the flat face of the head of a pin 22, which face stands at right angles to the axis of shaft 16. The said pin 22 is co-axial with the latter and is guided in a holder 23 bracketed to the bed 1. The said pin 22, further, abuts against the free end of the horizontal arm 24 of a second bell crank lever pivoted to the bed 1. The free end of the vertical arm of the second bell crank lever is provided with a set screw 25. The latter acts onto the transmission elements of a recording device 26 of any suitable known type and design, which plots the relative movements of the sleeve 15 and shaft 16, that is the curve of errors of the two toothed wheels 7 and 8, greatly magnified to the paper of the writing drum 27. The latter is rotated from the splined shaft 11 through the bevel wheels 29, 30 in accord with the test wheel 7.

The apparatus described operates as follows:

After the electric motor 14 has been switched on, the toothed wheel 7, which has to be tested, is slowly rotated. Suitably a regulable motor is used, which rotates the wheel 7 once in from half a minute to three minutes, according to its diameter. Such rotary movement is transmitted through the measuring disc 5 to the measuring disc 6. The gearing ratio of the said discs 5 and 6 must be identical with that of the toothed wheels 7 and 8, but their diameters may be equal to or smaller than the corresponding pitch circle diameters. In the latter case, the said two discs are interconnected, for example, through a steel tape or other transmission means, and the shafts 4 and 16 are set to their normal spacing. The toothed wheel 7, then, also transmits its rotation to the toothed wheel 8. Such transmission may take place through either the left or the right tooth flanks.

The following device is provided for bringing into mesh the desired left or right tooth flanks of the two wheels 7, 8:

A journal 31 (Figs. 3, 4) is provided on the housing 17, and a fork 32 is rotatably mounted on and fixed to the said journal 31. A stud 33 is fixed in the sleeve 15, diametrically opposite to the said stud 19, and is connected to the fork 32 through two helical springs 34. The fork 32, now, is correspondingly rocked on journal 31, and then clamped tight to the latter by means of the screw 35. The sleeve 15 and shaft 16 are thereby securely interconnected so that the transmission will take place through the desired tooth flank. However, although the two cylindrical measuring discs 5, 6 are driven at exactly the same peripheral speed, the driven toothed wheel 8 does not turn in exact agreement with the disc 6, owing to the errors of all kinds inherent in the two teeth.

Since the vertical arm 18 of the bell crank lever 18, 18' is engaged with or coupled to the stud 19 in the sleeve 15, owing to the tension of a helical spring 36 (Fig. 1) on the two-arm lever 21, the horizontal arm 18' of the said bell crank lever undergoes slight relative rocking movements, in correspondence with the tooth errors. The latter are transmitted through the subsequent transmission elements to the marking or recording-device 26 which plots the curve of errors in dependence on the rotation of the toothed wheel 7. The direction or sense of rotation has no influence on the measuring or gauging operation. The gearing ratio of the marking or recording device is adjustable in correspondence with the various sizes of the toothed wheels.

What I claim as new, and desire to secure by Letters Patent, is:

1. A gauging apparatus for gear wheels operating according to the single flank intermeshing method, comprising a bed, a carriage mounted for rectilinear movement on the bed, a vertical shaft rotatably mounted in said carriage, a sleeve rotatably mounted in said bed, a second vertical shaft extending through said sleeve and rotatable relative to the sleeve, said two vertical shafts being adapted to carry the gear wheels to be tested in normal intermeshing relationship, a first measuring disc carried by said first mentioned vertical shaft, a second measuring disc operatively interconnected with said first mentioned measuring disc and carried by said sleeve, the transmission ratio between said operatively interconnected measuring disc being identical with the gear ratio between the two gear wheels to be tested, a movement transmission pin mounted for axial displacement in said bed in axial alignment with said second shaft, a housing connected to the lower end of said second shaft to turn therewith, a radially extending stud carried by the lower end of said sleeve, a bell crank lever mounted in said housing, one arm of said lever extending in the direction of the axis of said sleeve and cooperating with the free end of said stud, and the second arm of said lever extending radially with respect to said sleeve, a link cooperating with the free end of said second arm of the bell crank lever, a two-armed lever having one arm coacting with said link and the other arm coacting with one end of said movement transmission pin, whereby relative rotary movement between said sleeve and said second vertical shaft is transformed into a rectilinear movement of said transmission pin, lever means fulcrumed on said bed and engaged by the other end of said movement transmission pin, a recording device carried by said base and including a marking drum and a stylus, and gear-and-spindle means operatively connected to said first mentioned shaft and to said marking drum, for simultaneously driving said two shafts, sleeve and drum.

2. A gauging apparatus as claimed in claim 1, and comprising a pin carried by said sleeve, a journal provided on said housing, a fork adjustably mounted on said journal spring means inserted between opposite fork ends and said pin to resiliently interconnect said housing and said sleeve, whereby according to adjustment of said fork on its journal the sleeve may be urged in one or the other direction to obtain engagement of the respective tooth flanks of the gear wheels to be tested.

ALBERT AEPPLI.

REFERENCES CITED

The following references are of record in the file of this patent:

UNITED STATES PATENTS

| Number | Name | Date |
|---|---|---|
| Re. 15,013 | Sauer | Dec. 21, 1920 |
| 1,444,470 | Laessker | Feb. 6, 1923 |
| 2,437,101 | Larsen | Mar. 2, 1948 |

FOREIGN PATENTS

| Number | Country | Date |
|---|---|---|
| 600,670 | Great Britain | Apr. 15, 1948 |